US009115912B2

(12) United States Patent
Min et al.

(10) Patent No.: US 9,115,912 B2
(45) Date of Patent: Aug. 25, 2015

(54) FLUID HEATING DEVICE

(75) Inventors: Hung Sik Min, Daegu (KR); Young Geun An, Daegu (KR); Sung Jin Yang, Daegu (KR)

(73) Assignee: CMTECH CO., LTD., Daegu (KR)

( * ) Notice: Subject to any disclaimer, the term of this patent is extended or adjusted under 35 U.S.C. 154(b) by 1095 days.

(21) Appl. No.: 12/864,502

(22) PCT Filed: Jan. 20, 2009

(86) PCT No.: PCT/KR2009/000295
§ 371 (c)(1),
(2), (4) Date: Jul. 23, 2010

(87) PCT Pub. No.: WO2009/093832
PCT Pub. Date: Jul. 30, 2009

(65) Prior Publication Data
US 2010/0296800 A1 Nov. 25, 2010

(30) Foreign Application Priority Data
Jan. 23, 2008 (KR) ........................ 10-2008-0007096

(51) Int. Cl.
*A47J 31/00* (2006.01)
*B67D 7/80* (2010.01)
(Continued)

(52) U.S. Cl.
CPC ................ *F24H 1/121* (2013.01); *F24H 1/202* (2013.01); *F24H 9/1827* (2013.01); *H05B 3/42* (2013.01); *H05B 2203/021* (2013.01)

(58) Field of Classification Search
CPC .......... F24H 1/60; F24H 2203/00; H05B 1/00
USPC .................. 219/628–631, 688, 689; 392/341, 392/441–468; 126/583, 639–642, 344
See application file for complete search history.

(56) References Cited

U.S. PATENT DOCUMENTS

| | | | | |
|---|---|---|---|---|
| 4,692,592 | A * | 9/1987 | Kale | 392/450 |
| 2009/0020518 | A1 | 1/2009 | Ikeda et al. | |
| 2010/0092163 | A1 * | 4/2010 | Yeung | 392/441 |

FOREIGN PATENT DOCUMENTS

| | | | |
|---|---|---|---|
| CN | 2650016 | Y | 10/2004 |
| CN | 101048625 | A | 10/2007 |

(Continued)

OTHER PUBLICATIONS

International Search Report for PCT/KR2009/000295 mailed Sep. 16, 2009.

(Continued)

*Primary Examiner* — Tu B Hoang
*Assistant Examiner* — Thomas Ward
(74) *Attorney, Agent, or Firm* — Revolution IP, PLLC

(57) ABSTRACT

The present invention relates to a fluid heating device which can instantaneously heat a fluid which is flowing for the purpose of supply or circulation. It comprises: a ceramic heater in the form of a flat plate having terminal lead wires for applying a power source; partition plates, to top and bottom of the ceramic heater, which allow the fluid which is to be heated to move towards the ceramic heater and which said partition plates have horizontal-movement fluid pathways such that fluid which has been heated by means of the ceramic heater is discharged; a flow path forming plate having a fluid through path such that the fluid on the horizontal-movement fluid pathways can move vertically to the fluid pathway of the next layer; an upper cover having an inlet hole for the supply of a fluid for heating the outside surface of the uppermost partition plate; and a final lower cover having an outlet hole for discharging the heated fluid onto the outside surface of the lowermost partition plate.

8 Claims, 11 Drawing Sheets

(51) Int. Cl.

| | |
|---|---|
| ***F24H 1/10*** | (2006.01) |
| ***F24H 1/12*** | (2006.01) |
| ***F24H 1/20*** | (2006.01) |
| ***F24H 9/18*** | (2006.01) |
| ***H05B 3/42*** | (2006.01) |

(56) References Cited

FOREIGN PATENT DOCUMENTS

| | | | |
|---|---|---|---|
| JP | 59-67740 | U | 5/1984 |
| JP | 05-42958 | U | 6/1993 |
| JP | 2000-154581 | A | 6/2000 |
| JP | 2001-41580 | A | 2/2001 |
| JP | 3132102 | U | 5/2007 |
| KR | 20-1991-0007621 | | 5/1991 |
| KR | 20-1992-0021719 | | 12/1992 |
| KR | 20-0269038 | | 3/2002 |
| KR | 10-2003-0021274 | | 3/2003 |
| KR | 10-0481276 | | 3/2005 |

OTHER PUBLICATIONS

International Preliminary Report on Patentability for PCT/KR2009/000295 issued Jul. 27, 2010.

* cited by examiner

FLUID HEATING DEVICE

RELATED APPLICATIONS

This application is a 371 application of International Application No. PCT/KR2009/000295, filed Jan. 20, 2009, which in turn claims priority from Korean Patent Application No. 10-2008-0007096, filed Jan. 23, 2008, both of which are incorporated herein by reference in their entireties.

BACKGROUND OF THE INVENTION

1. Field of the Invention

The present invention relates to a fluid heating device, in more detail, a small-sized fluid heating device that can instantaneously heat fluid flowing for supply or circulation, due to high heating efficiency.

2. Description of the Related Art

A typical fluid heating device 1 is shown in FIG. 1, which is a storage-typed hot water supply system that heats a predetermined amount of water stored in a tank 2 and retains the heat always at predetermined temperature (e.g., about 40° C.)

Because the storage amount is limited in the storage-typed hot water supply system, hot water at predetermined temperature is supplied while the storage amount of water is discharged; however, the hot water gradually decreases in temperature and hot water under the predetermined temperature is discharged, when the system is used for a long time above the storage amount of water, such that it has a limit as a hot water supply system.

That is, it is limitative to use the system because the use time is limited and it is required to intermittently operate the system in order to supply hot water at predetermined temperature and keep the temperature.

Further, it is required to increase the size of the tank to ensure a predetermined storage amount and accordingly the system increases in size. It is also required to continuously supply electric power such that the temperature of the tank having predetermined heat loss is maintained in order to use the system at anytime. Therefore, the system unnecessarily wastes electric energy and causes a sanitary problem, because it keeps the temperature for bacteria and mold to easily proliferate.

An instantaneous-heating type fluid heating device 5 shown in FIG. 2 has been proposed, which uses a cylindrical ceramic heater in order to remove the defects of the storage-typed hot water supply system.

The fluid heating device 5 has the advantage of discharging hot water at predetermined temperature for a long time, because it can instantaneously heat the water (or fluid) flowing into a heating tank 7 through the cylindrical ceramic heater 6 at predetermined temperature, using electric heat from the ceramic heater 6.

However, it is difficult to accurately manufacture the cylindrical ceramic heater in order to reduce the diameter and the heating area is correspondingly reduced, such that it needs to maintain the size above a predetermined level. Meanwhile, when the heating area is large, the cross section of the flow path increases and the flow speed decreases, such that heat transfer efficiency is reduced and the thermal efficiency of the fluid heating device is correspondingly reduced.

In addition, it is limitative to reduce the size because of the dimension of the cylindrical ceramic heater and. Further, a predetermined amount of water is naturally stored, such that the control response becomes low and it is difficult to rapidly change the predetermined temperature.

In particular, the oxygen dissolved in the water cannot be instantaneously dissolved and a large amount of very small bubbles are generate due to the instantaneous heating. The bubbles can be discharged with the flow of water at high flow speed; however, the bubbles collect and remain on the surface of the ceramic heater and easily develop in a large bubble.

The large bubble developed from the bubbles collecting and remaining on the surface of the ceramic heater causes local thermal non-uniformity and a thermal shock in the ceramic heater, such that the ceramic heater is broken.

In order to prevent these problems, there has been effort of applying hydrophilic oxide on the surface of the ceramic heater such that to prevent the bubbles from developing on the surface. However, this method cannot be a basic solution, because various deposits are attached to the surface when it is used for a long period of time.

Further, the way of using the cylindrical ceramic heater has a fundamental problem in that the heating area is considerably reduced to increase the flow speed, whereas the flow speed on the ceramic surface is reduced to increase the heating area, due to a problem in the shape of the cylindrical ceramic heater.

FIG. 3 shows another fluid heating device 10 proposed in the related art, in which a ceramic flat plate heater 12 is interposed between flat plate device bodies 11 and flow paths 13 are formed in the device body 11 to form a heat transfer part.

According to the fluid heating device 10, although it is possible to achieve a small-sized device by implementing heat transfer through the flow paths formed in predetermined heating areas, the heating area is reduced by partitions 14 formed to forming the flow paths 13 and contacting the heating surface of the heater 12, such that the direct heating area contacting the fluid to heat is further reduced.

A dynamic heat transfer equilibrium state in which an inlet and an outlet of water is formed through a single ceramic heating surface may increase temperature difference in the ceramic plate heater, such that it is difficult to increase the size. However, when the size is reduced, it is required to increase the internal pressure for passing a predetermined amount of fluid due to the reduction of heat transfer area caused by forming the flow paths. Further, it is required to increase an output density per unit area.

Another similar configuration has been proposed, but, in which heat transfer is made while fluid flows through a plurality of flow paths arrange in parallel on one surface from the center of one flat plate ceramic heater and returns and flows through a plurality of flow paths formed on the opposite heating surface.

According to this configuration, fluid enters one side of the plate ceramic heater, flows to the opposite side through a plurality of flow paths formed on the heating surface, and then flows into a hot water sub-tank through a plurality of flow paths formed by copperplates on the opposite heating surface. In this structure, heat transfer is implemented through copperplates between the hot water sub-tank and the flow paths passing through the last heating surface entering hot water sub-tank.

SUMMARY OF THE INVENTION

It is difficult to reduce the size of the storage-typed hot water supply system of the related art and the capacity that can be immediately used is limited. Electric power loss continuously occurs while the system is not used and the tank may be constantly exposed to insanitation state.

Although it is possible to slightly reduce the size and improve the response, but it is also limitative, in the instantaneous-heating type hot water supply system using a ceramic heater having high heating output in order to overcome the problems in the storage-typed hot water supply system. A structure that can improve thermal non-uniformity because the ceramic heater is vulnerable to a thermal shock is required; however, the cylindrical ceramic heater has problems, such as limitative heating response and thermal shock breakage due to development of bubbles, such that it is limitative to improve the heating output.

In a flat plate ceramic heater that is another configuration of the instantaneous-heating type, thermal non-uniformity is increased by the structure that reduces the heating surface, increases a difference in temperature of one heating plate, and have a difficulty in removing the bubbles generated, such that a problem may occur in durability and safety of the ceramic heater.

Further, the improved structure of the flat plate ceramic heater does not reduce the heating surface because the walls forming the flow paths does not contact the heating surface; however, the response may decreases due to the structure that heats the hot water sub-tank with one heater.

In addition, local flow speed reduction sections are easily formed by the copperplate for heat transfer and flow rate division and bubble are easily generated from the oxygen dissolved in the water in instantaneous heating, and collected and developed, such that the ceramic heater may be easily exposed to a thermal shock.

Technical Solution

The present invention was designed to overcome the problems, it is an object of the present invention to provide a method that can improve heating efficiency by maximizing the heat transfer surface between a heater and fluid with a small volume such that the fluid can rapidly reach predetermined temperature by instantaneous heating.

The present invention includes one or a plurality of ceramic heaters having a heating electrode having predetermined resistance in a ceramic insulator, a heating flow path is formed on the heating surfaces of the heaters for fluid to transfer heat, and the heating flow path can sufficiently increase the area contacting the heating surface per unit volume of the fluid, such that it is possible to increase heat transfer efficiency.

In the ceramic heater, the heating resistor is positioned in the ceramic insulator, such that it can be insulated from fluid, such as water, and has two heating surfaces for transferring heat at high output density. Accordingly, the flow of fluid horizontally moving along one heating surface and then passing the opposite heating surface can maintain a relative high flow speed; however, the heating surface contact area per unit volume of the flow path is large, such that the fluid can sufficiently transfer heat by remaining on the heating surface as long as possible.

The present invention having this configuration has rapid response and can be manufactured in a small size, such that it can be continuously used for a long time. Further, it is possible to prevent the ceramic heater from being exposed to a thermal shock by keeping the flow speed above a predetermined level while maintaining the heating area. Furthermore, it is possible to maintain uniform temperature in the ceramic heater and device in a dynamic normal state heating the fluid. In addition, it is possible to achieve safety and durability for the device by optimizing the device such that the fluid can efficiently transfer heat with the surface of the ceramic heater.

The present invention relates to a fluid heating device having a heat-transfer structure that is efficient and has small thermal capacity by increasing an area ratio of a heating surface per unit volume of fluid, and is useful for devices required to simply change temperature of fluid, because it is possible to rapidly heat the fluid at temperature instantaneously set.

Further, it is possible to achieve high reliability and continuous use, because of the heat-transfer structure that can improve patent performance against a thermal shock while using high-efficiency and high-output ceramic heater.

Therefore, it is possible to reduce the size without a hot water storing tank and prevents unnecessary loss of power, such that there are many advantages to reduce power consumption.

DETAILED DESCRIPTION OF THE PREFERRED EMBODIMENTS

Figure 1:
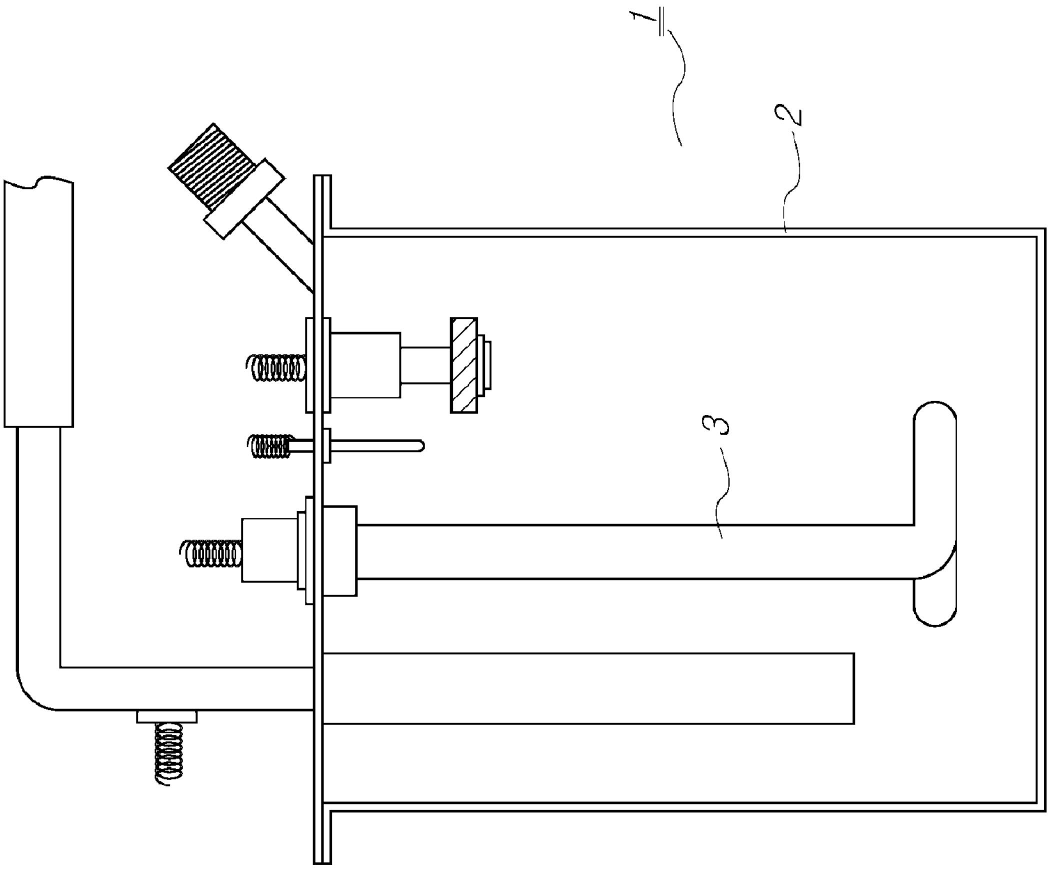
FIG. 1 is a cross-sectional view showing the configuration of a first embodiment of a fluid heating device according to the related art.
Figure 2:
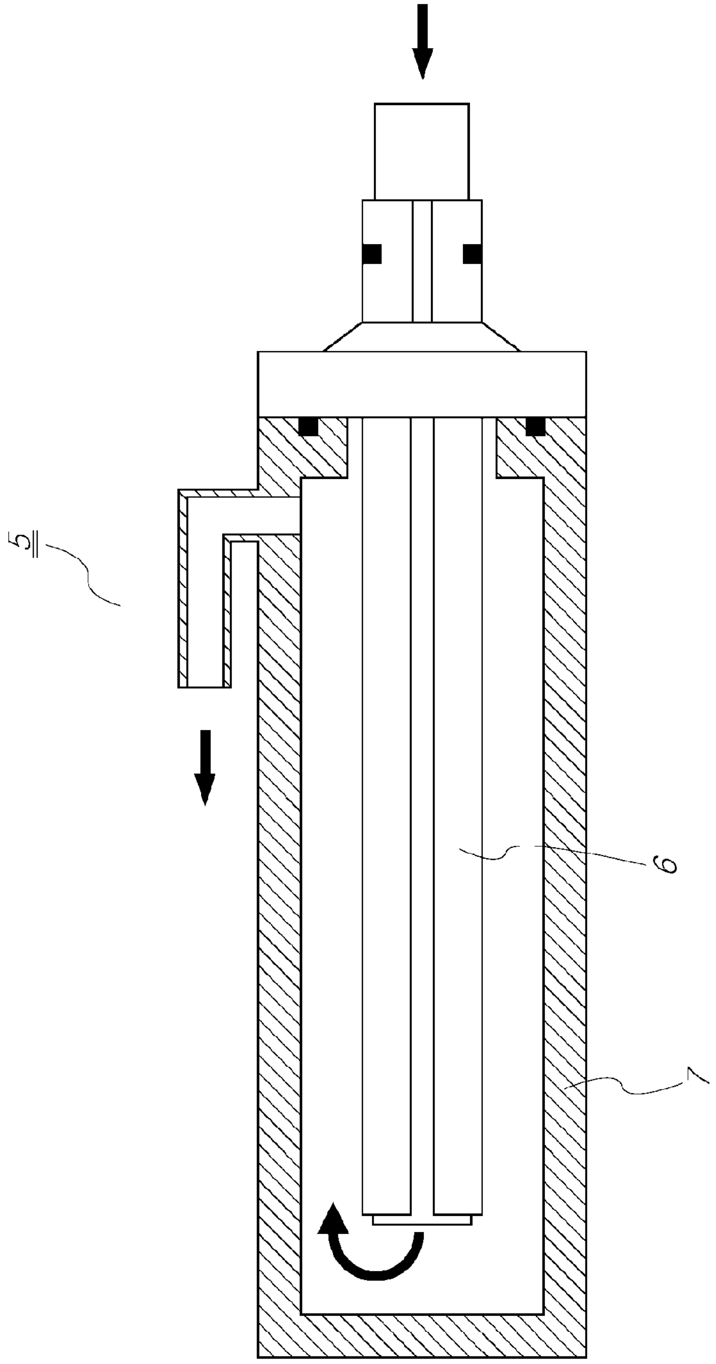
FIG. 2 is a cross-sectional view showing the configuration of a second embodiment of a fluid heating device according to the related art.
Figure 3:
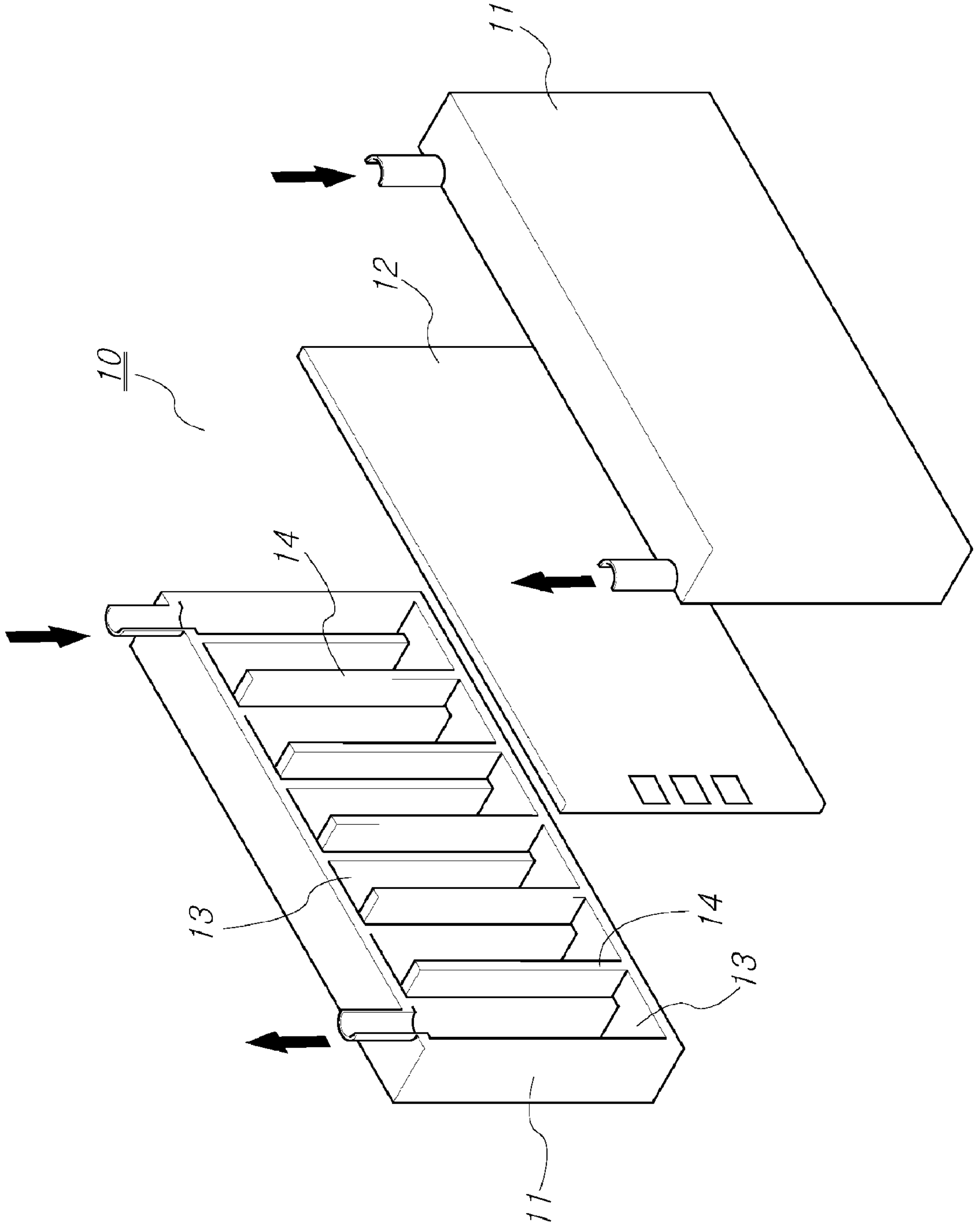
FIG. 3 is a cross-sectional view showing the configuration of a third embodiment of a fluid heating device according to the related art.
Figure 4:
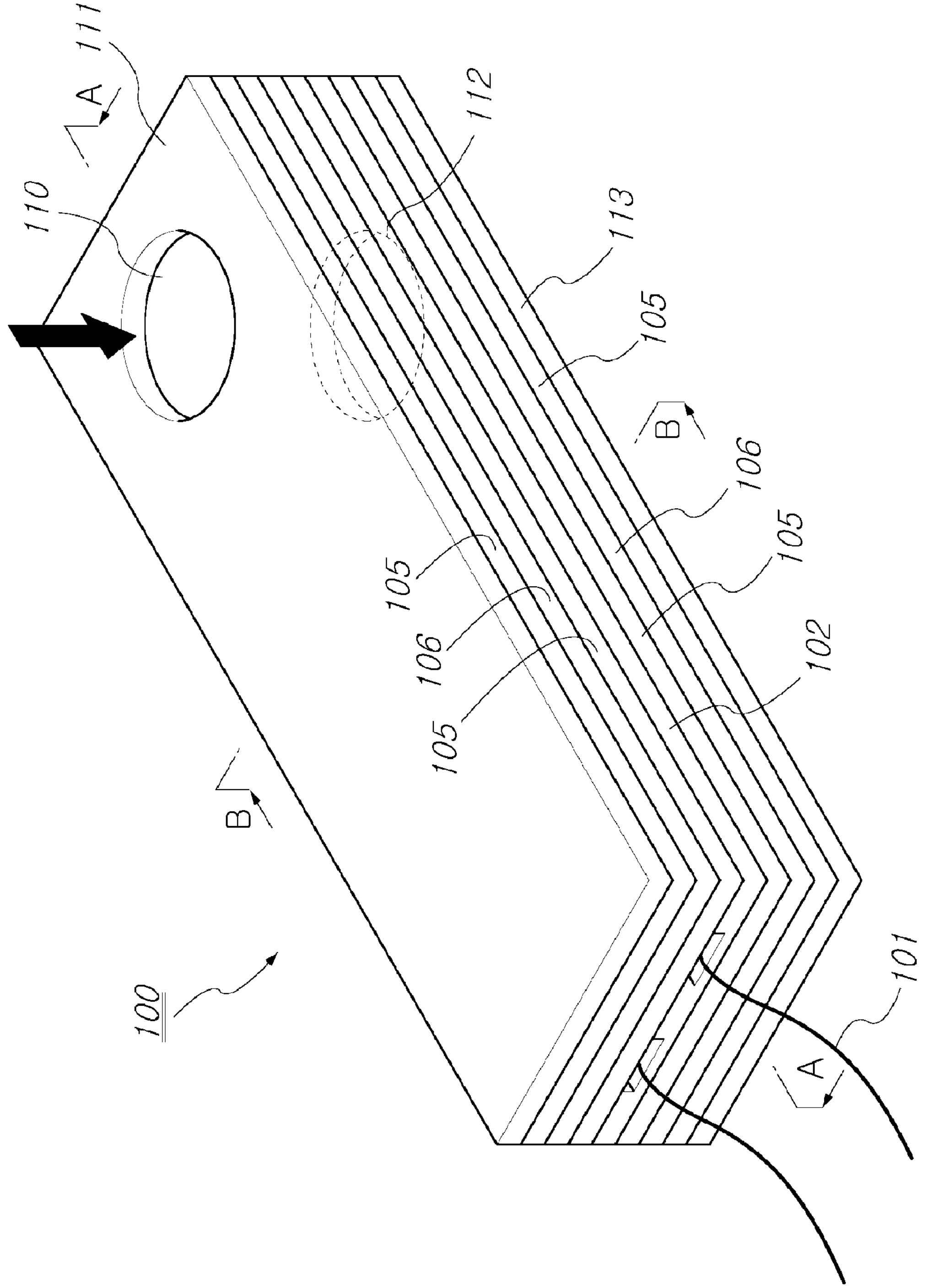
FIG. 4 is a perspective view showing a first embodiment of a fluid heating device according to the present invention.
Figure 5:
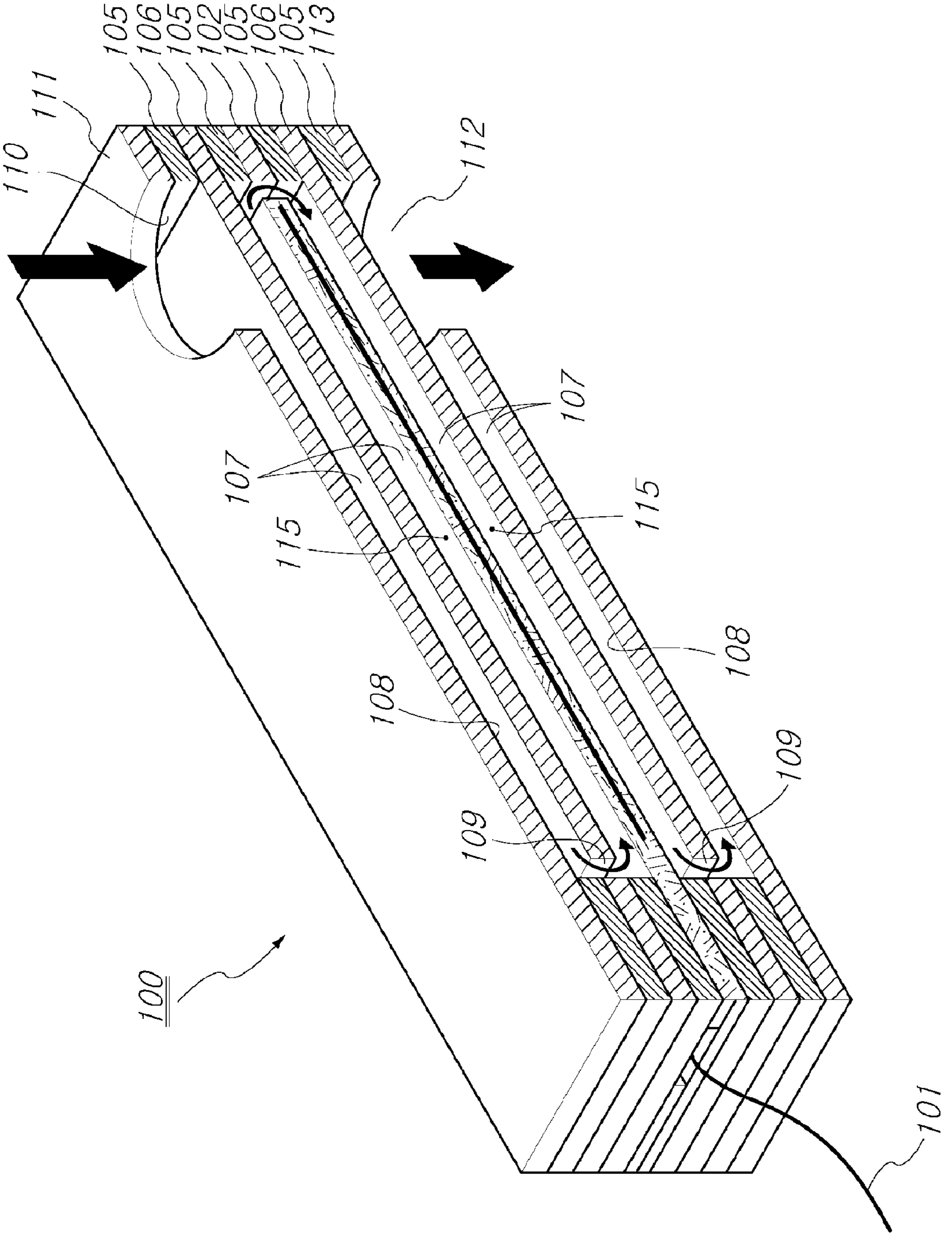
FIG. 5 is a cross-sectional view of the fluid heating device according to the present invention, taken along line A-A.
Figure 6:
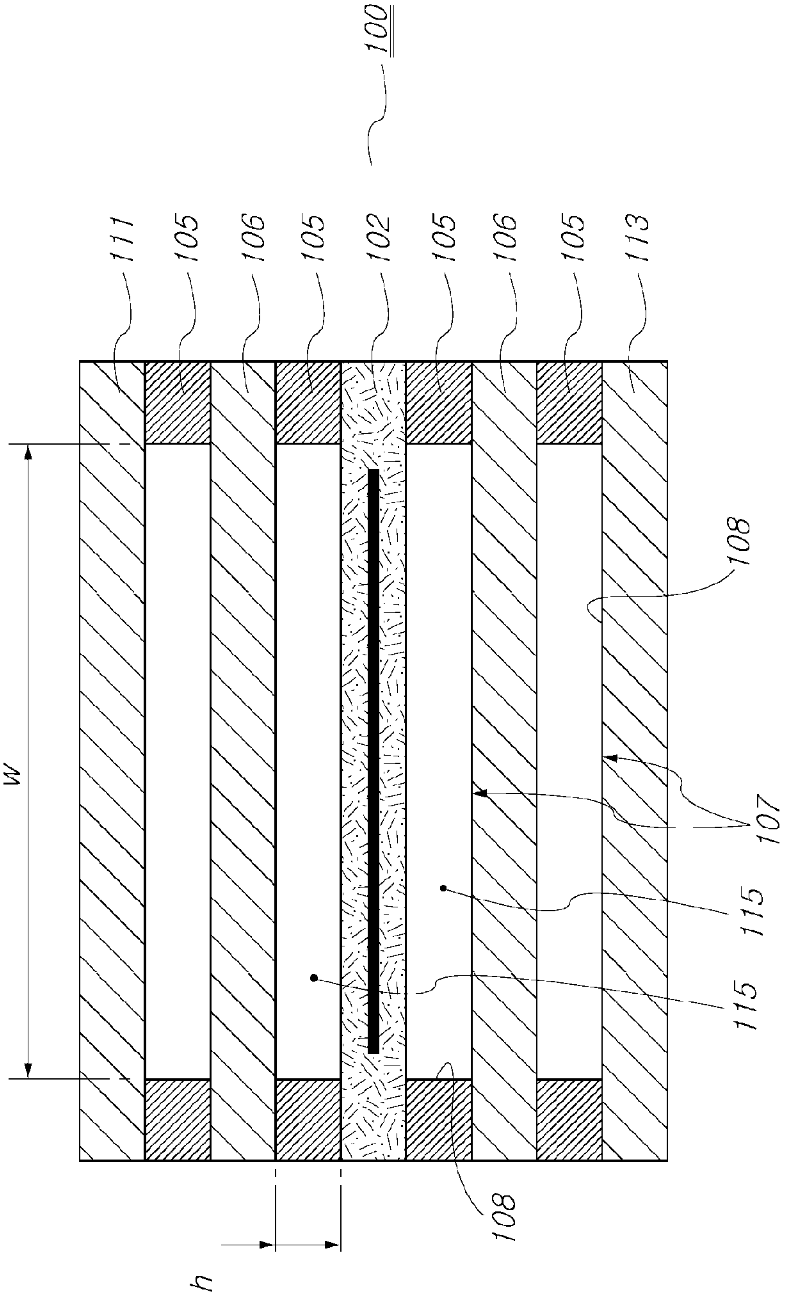
FIG. 6 is a cross-sectional view of the fluid heating device according to the present invention, taken along line B-B.
Figure 7:
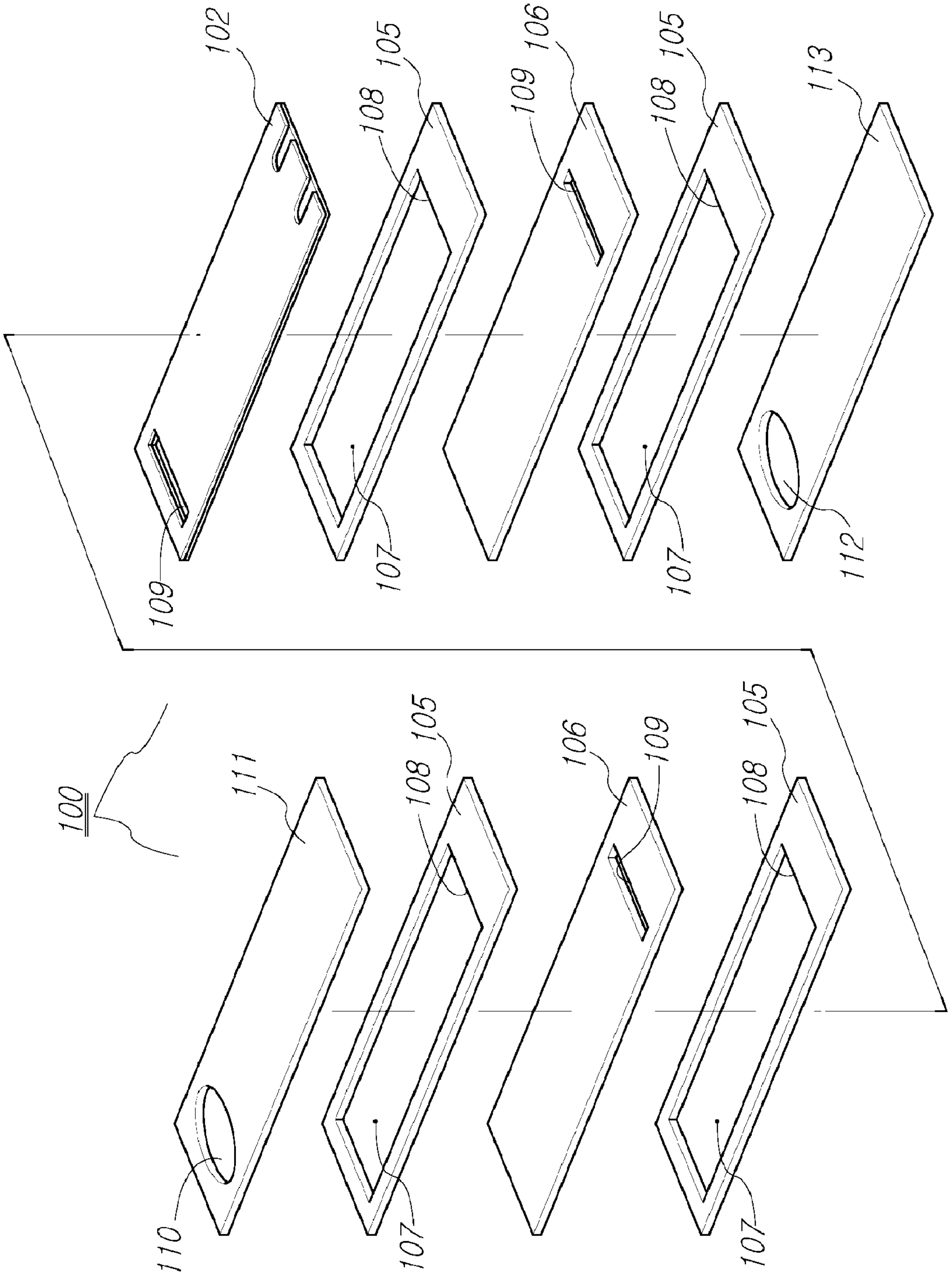
FIG. 7 is an exploded perspective view showing the fluid heating device according to the present invention.
Figure 8:
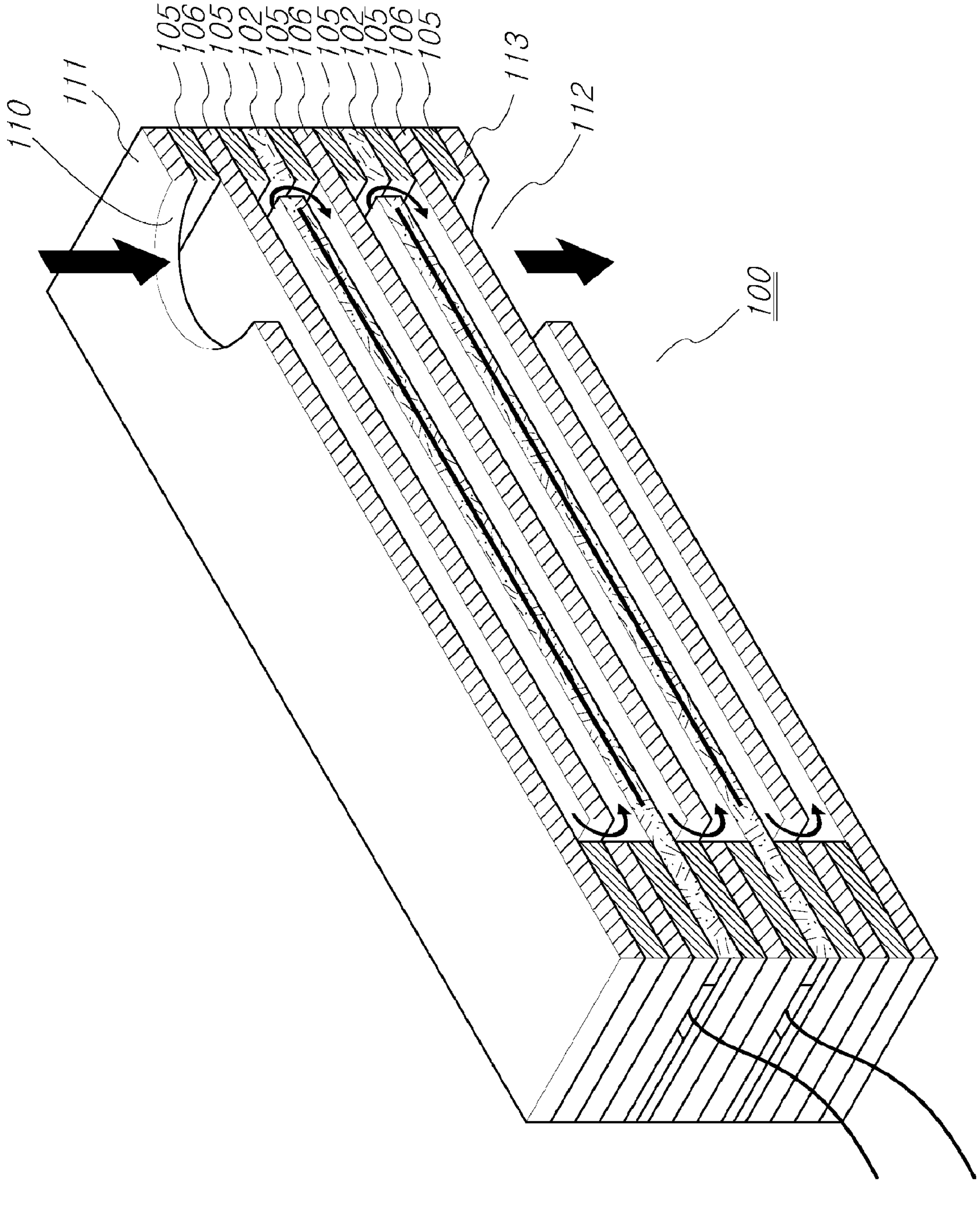
FIG. 8 is a perspective view showing a second embodiment of a fluid heating device according to the present invention.
Figure 9:
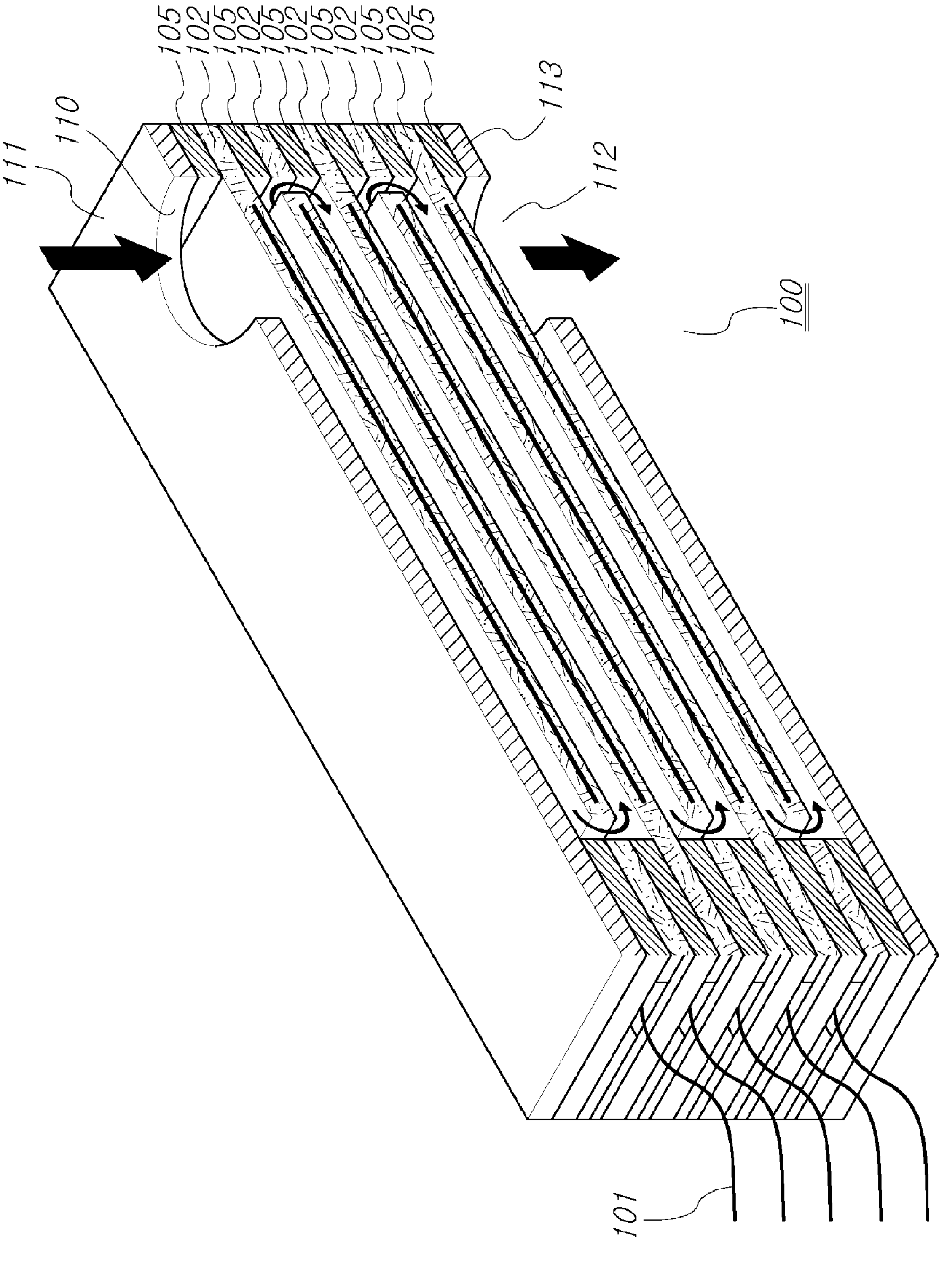
FIG. 9 is a perspective view showing a third embodiment of a fluid heating device according to the present invention.
Figure 10:
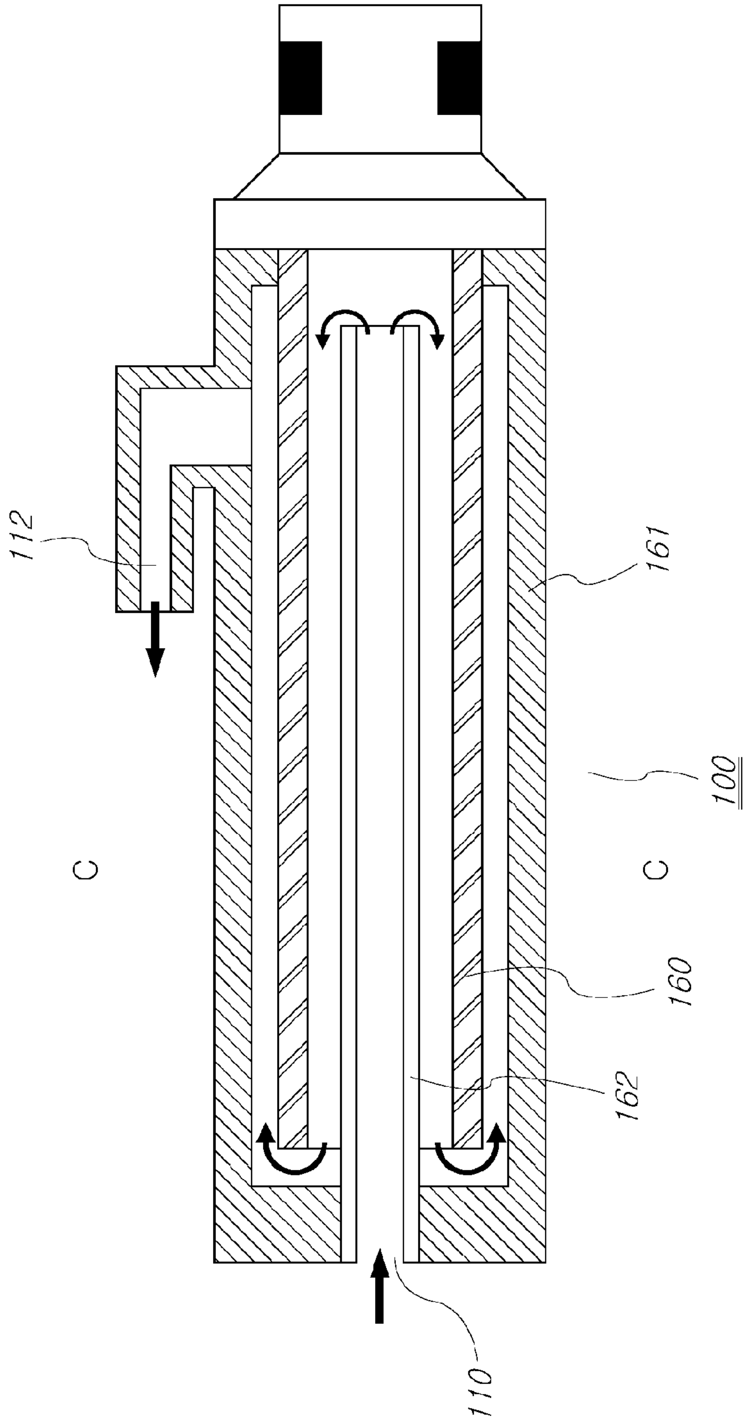
FIG. 10 is a cross-sectional view showing a fourth embodiment of a fluid heating device according to the present invention.
Figure 11:
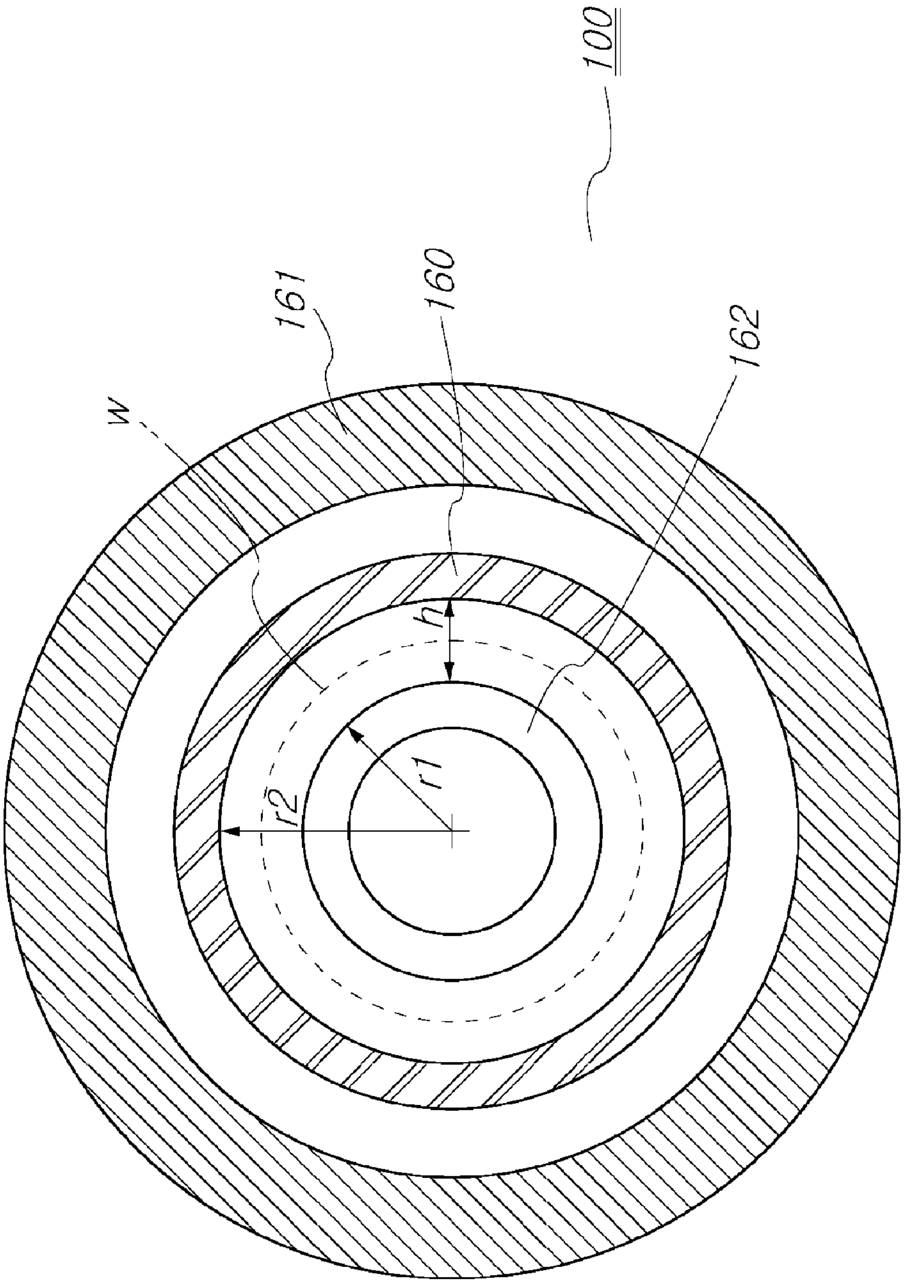
FIG. 11 is a cross-sectional view of the fluid heating device shown in FIG. 10, taken along line C-C.

In a fluid heating device 100 according to the present invention, a flat plate ceramic heater 102 with terminal lead wires 101 for supplying power exposed to the outside at the center is disposed at the center, and partition plates 105 and flow path forming plates 106 for forming fluid pathways through which fluid to heat flows to the ceramic heater 102 and is discharged after passing through the ceramic heater 102 are formed above and under the ceramic heater 102.

A pathway hole 108 is formed in the partition plate 105 such that a fluid pathway 107 allowing fluid to horizontally move, and a fluid pathway 109 is formed through the side opposite to the lead wire 101 of the ceramic heater 102 and flow path forming plate 106 such that the fluid can move to the fluid pathway 107 of the next layer.

It is preferable that the fluid pathway 109 is alternately formed left and right in the figure, not in the same direction in consideration of zigzag flow of the fluid and it is apparent that the number of the partition plate 105 and the flow path forming plate 106 which are stacked in a multiple layer can be increased and decreased.

An upper cover 111 having an inlet hole 110 for supplying the fluid to heat and a lower cover 113 having an outlet hole 112 for discharging heated fluid are disposed at the outside of the uppermost and lowermost partition plates 105, respectively.

The fluid heating device 100 may be made of ceramic in consideration of durability, but the partition plate 105, the flow path forming plate 106, and the upper and lower covers 111, 113, except for the ceramic heater 102, may be metal, nonmetal, or heat-resistant plastic in consideration of improving productivity and reducing the cost.

Further, although the partition plates 105, the flow path forming plates 106, and the upper and lower covers 111, 113 are independently formed in the present invention, the configuration may be implemented in various ways, such as integrally forming the others, except for the ceramic heater 102, integrally forming the partition plates 105 and the flow path forming plates 106, integrally forming the partition plates 105, the flow path forming plates 106, and the upper covers 111, or integrally forming the partition plates 105, the flow path forming plates 106, and the lower cover 113.

The fluid pathway formed by the partition plate 105 and the flow path forming plate 106 which are adjacent to the ceramic heater 102 is a heating flow path 115 where the fluid is directly heated by the ceramic heater 102, such that a process of heating the fluid, using predetermined heat transfer occurs in the heating flow path 115.

The most remarkable feature of the fluid heating device 100 of the present invention is that a cross-sectional area is defined by the height 'h' of the partition plate 105 and the width 'w' of the heating surface of the flat plate ceramic heater 102, that is, the height 'h' and the width 'w' of the heating flow path 115 and the aspect ratio 'r' of the heating flow path 115 may be defined as follow.

$$r=w/h$$

The aspect ratio of the cross-sectional area of the heating flow path 115 is important for effectively transmitting energy, which is applied to the fluid from the heating surface (ceramic heater), to the fluid per unit volume. Reducing the aspect ratio, such as a cube or a circle, has the advantage of passing a large amount of fluid at low pressure, because the cross-sectional ratio of the flow path per unit volume is large.

However, the transmission speed of heat from the heating surface to the center of the heating flow path is low, such that temperature difference of the fluid increases in the temperature distribution on the cress section of the flow path and heat transfer efficiency decreases.

Further, a large amount of bubbles are generated on the heating surface in the fluid heating device 100, in which bubbles collecting on the heating surface are likely to develop, because the temperature difference is large for the cross-sectional area having a small aspect ratio and the fluid passes the heating surface at a relatively low speed.

Although it is known that as the temperature of the fluid increases, the gases which are generally dissolved in water, including oxygen, decrease in solubility and are liquated, the bubbles generated in the heating flow path 115 have difficulty in collecting on the heating surface at a high flow speed, whereas the bubbles collect on the ceramic heating surface and develop at a low flow speed.\

When the volume of the gases collecting on the heating surface increases, the heating surface simultaneously contacts liquid having high thermal capacity and gases having low thermal capacity, such that a portion of the heating surface contacting only the gases rapidly increases in temperature and rapid temperature difference occurs at the portion, and accordingly, it is exposed to a thermal shock.

On the contrary, when the aspect ratio of the cross-sectional area of the heating flow path is large (preferably, w/h>3), the area of the heating area per unit volume increases and the flow speed per unit flow rate increases, which, subsequently, reduces temperature difference of the fluid in the temperature distribution in the cross-sectional area of the heating flow path and derives efficient heat transfer while removing opportunities for bubble collection and bubble development on the heating surface. Therefore, it is possible to achieve a very stable structure for heat transfer by preventing breakage of the ceramic heater.

For example, assume a fluid heating device having a heating flow path that has 140 mm (70 mm×both sides) length 'l' and a heating surface that is 20 mm wide and 1 mm high.

The aspect ratio of the heating flow path is 20, the total volume of the heating flow path is 2,800 $mm^3$, and the heating area is 2,800 $mm^2$. Meanwhile, for a fluid heating device including a case having a 14 mm diameter in which a circular tube ceramic heater having a 6.5 mm inner diameter, a 10 mm diameter, and a 140 mm (70×(inner diameter+outer diameter)) length of a heating flow path, the total volume is 7,596 $mm^3$ and the heating area is 3,627 $mm^2$ in the heating flow path.

The area/volume ratio is 1 $mm^{-1}$ in the fluid heating device having a large aspect ratio and 0.48 $mm^{-1}$ in the fluid heating device having a circular tube ceramic heater; therefore, the larger the aspect ratio, the more the heating area per volume can be increased. Further, the distance between the heating surface and the center of the flow path is 0.5 mm in the fluid heating device having an aspect ratio of 20, whereas it is 3.25 mm and 2 mm for the inner surface and the outer surface, respectively, in the fluid heating device having a circular tube ceramic heater.

Accordingly, the distance depending on convection in the fluid having a heat transfer rate larger than conduction increases, such that the heat transfer efficiency may considerably decrease, and possibility of bubble generation on the heating surface of the circular tube ceramic heater increases and possibility of exposure to a thermal shock increases.

On the contrary, according to the structure provided by the present invention, the thermal efficiency can be increased by reducing the distance between the heating surface and the center of the flow path and high reliability can be achieved by reducing the possibility to be exposed to a thermal shock in the heating surface.

The ceramic heater can transfer a large amount of heat by conduction, because it is manufactured by disposing the heating surface of a metal resistor in a ceramic material, which is an insulator, such that the ceramic heater has excellent properties as a high-speed heating unit.

On the other hand, this ability may be vulnerable to a thermal shock, because the structure is formed by ceramic. Therefore, it is required to use a ceramic heater having a larger area, because heat output per unit area should be appropriately limited, when higher heating capacity is required.

However, when a single ceramic substrate has a large area, it is a more efficient design to use a plurality of ceramic heater, because the limit of heat output per unit area decreases.

In this case, it is possible to effectively increase the heating area by alternately stacking flow path forming plates 106 with a plurality of ceramic heaters 12 therebetween and inserting partition plates 105 between them. In addition, it is possible to effectively increase the heat output by replacing the flow path forming plate 130 with the ceramic heater 102, because it is possible to achieve a larger heating area with the same flow path volume.

As an example using a plurality of ceramic heater 102, assume a fluid heating device having a heating flow path that has 420 mm (70 mm×both sides×3 heaters) length 'l' and a heating surface that is 20 mm wide and 1 mm high.

The aspect ratio of the heating flow path is 20, the total volume of the heating flow path is 5,600(4×1,400)$mm^3$, and the heating area is 8,400(6×1,400)$mm^2$. In the fluid heating device having this configuration, the area/volume ratio is 1.5 $mm^{-1}$, which increases about 3.1 times, as compared with that the fluid heating device having a circular tube ceramic heater has the area/volume ratio of 0.48 $mm^{-1}$, such that it can bee seen that the heating efficiency can be efficiently increased.

The most important part in the fluid heating device 100 is the ceramic heater 102, which is a heater showing good heating performance in "conduction", which fastest transfers heat among radiation, convection, and conduction, which are general ways of transferring heat.

Good heat transfer features are achieved because an object to heat is heated by direct contact, by the most directly insulating the conductive heat resistor in the electric heating device using electricity.

Although a method of manufacturing the ceramic heater 102 which can be applied to the present invention is various and not specifically limited, a typical method is to manufacture a ceramic heater, using co-firing.

It is to apply heat resistors to one ceramic green sheet and laminate another ceramic sheet, and co-fire the heat resistors applied in the ceramic sheet.

The ceramic used for this configuration is a compound generally containing $Al_2O_3$ 96% with a small amount of SiO2, CaO, MgO, $Na_2O$, $K_2$, O, and the metal used for the heat resistor is usually metal having a high meting point, such as W and Mo.

The circular tube ceramic heater is usually manufactured by co-firing, which uses green sheets, and may be manufactured by rolling and co-firing a green sheet applied with heat resistors around a quasi-sintered ceramic tube.

Similarly, according to another method, it is possible to manufacture a ceramic heater similar to the ceramic heater manufactured by co-firing, by applying, driving, and sintering metal plate, as a heat resistor, to one sintered ceramic substrate, applying, driving, and removing an adhesive to another sintered ceramic substrate, and then bonding and sintering the substrates.

When a metal resistor is disposed between two sintered ceramic substrates and bonding-sintering is performed with a glass-ceramic sintered adhesive or a glass adhesive, the heat resistor may be metal paste mainly containing metal, such as W and Mo, which is metal having a high melting point and metal paste, such as Ag, Ag—Pd, $RuO_2$, Pd, and Pt, which is metal having a low melting point and low temperature resistance coefficient.

Ceramic sintered substrates that are generally used and inexpensive contain $Al_2O_3$ as the main component, and various kinds of ceramic substrates can be used as thermal shock-resistant materials, including an AIN sintered substrate, SiC sintered substrate, and $Si_3N_4$ sintered substrate.

When the parts of the fluid heating device 100 where the present invention is applied are made of ceramic, the surfaces contacting the partition plates 105 of the ceramic heater 102 and the flow path forming plates 106 are applied and removed with a glass adhesive, and both sides of the partition plates 105 are also applied and remove with a glass adhesive.

Further, it is possible to achieve the fluid heating device 100 that is generally sintering-bonded by stacking the parts, calcining or sintering them at temperature where the glass adhesive can be molten and bonded.

Although the shape of the inlet hole 110 and the outlet hole 112 through which the fluid flows into/out of the fluid heating device 100 is not specifically limited, it is possible to mold nuts or tubes which is made of various materials into holes, or house the fluid heating device 100 of the present invention into a case equipped with a case.

The features of the fluid heating device 100 of the present invention are not limited only to the ceramic heater, and may be modified such that the cylindrical ceramic heater 160 can have a large aspect ratio.

A flow path forming tube 162 is inserted in the cylindrical ceramic heater 160 combined with the case 161 having the inlet hole 110 and the outlet hole 112 for the fluid to flow inside and outside such that the flow flows inside the inner circumference of the flow path forming tube 162, exits along outer circumference of the flow path forming tube 162 and the inner circumference of the cylindrical ceramic heater 160, and the is discharged outside along the outer circumference of the cylindrical ceramic heater 160 again.

In this case, it is also possible to achieve a high aspect ratio and the flow direction of the fluid may be reversed.

In the fluid heating device including the cylindrical ceramic heater 160 where the technology of the present invention is applied, the width 'w' of the flow path contacting the heating surface (cylindrical ceramic heater) is $\pi\times(r_2+r_1)$ and the aspect ratio when the fluid exits is $\pi\times(r_2+r_1)\div(r_2+r_1)$.

For example, when $r_1$ is 10 and $r_2$ is 6, the aspect ratio is 12.6 and the cross-sectional area of the flow path is 201.

When the cross-sectional area of the flow path formed on the outer circumference of the cylindrical ceramic heater is made the same (for the same flow speed), $r_2$ is 14.5, $r_1$ is 12, and the aspect ratio is 33.3.

The heating surface is usually formed close to the outer circumference of the cylindrical ceramic heater and a very small gap is defined at a surface contacting the heating surface, such that it is possible to maximize a heating area per unit volume and expect high thermal efficiency.

Embodiment 1

A fluid heating device was configured such that a heating area was 7.5 $cm^2$[=50×15], two plate ceramic heaters having heating resistance of 35Ω were connected in parallel, and the cross-sectional areas of horizontal and vertical flow paths were 0.32 $cm^2$[=2 mm(h)×16 mm (w, heating surface), w/h=8].

When a voltage of 220V was applied and water continuously flowed at a flow rate of 1~1.2 L per minute, the water having initial temperature of 25° C. was continuously heated by 50~55° C. and power of 2.2 kW was consumed. This heating experiment was continued for about 5000 hours (210 days×24 hr), but the inner ceramic heater was not broken.

Embodiment 2

A fluid heating device is configured, in which a cylindrical ceramic heater having heating resistance of 20Ω, an inner diameter of 6.5 mm, an outer diameter of 10 mm, a heating length of 80 mm was used and a flow path forming plate (5 mm outer diameter and 4 mm inner diameter) was inserted inside the inner circumference.

The inner diameter of a case was set to 12 mm such that the aspect ratio of the flow path in the inner circumference was 24 and the aspect ratio of the outer circumference was 34.5, in this device. A voltage of 220V was applied and water flowed at a flow rate of 1~1.2 L per minute.

The water having initial temperature of 25° C. was continuously heated by 45~50° C. and this heating experiment was continued for about 3000 hours (125 days×24 hr), but the inner ceramic heater was not broken.

Embodiment 3

A fluid heating device was configured such that a heating area was 7.5 $cm^2$[=50×15], four plate ceramic heaters having heating resistance of 40Ω were connected in series, and the cross-sectional areas of horizontal and vertical flow paths were 0.08 $cm^2$[=0.5 mm(h)×16 mm (w, heating surface), w/h=32].

Vapor at 120~200° C. was produced at the outlet hole by power of 150~250 W by injecting mist (about 1 g water/L, air containing micro-drops of water produced by ultrasonic vibration) at 10 LPM and applying a voltage of 220V to the terminal of the series of ceramic heaters.

Comparative Example

A fluid heating device using a tube type ceramic heater of the related art having heating resistance of 20Ω, an inner diameter of 6.5 mm, an outer diameter of 10 mm, a heating length of 80 mm, a voltage of 220V was applied, and water continuously flowed at a flow rate of 1~1.2 L per minute The water having initial temperature of 25° C. was continuously heated by 44~46° C., power of 1.8 kW was consumed, and the ceramic heater was broken in about 480 hours (20 days×24 hr).

The present invention described above is expected to be widely used in an apparatus for cleaning a part of a human body, an instantaneous hot water supply system for home, a radiator for heating, and an apparatus for heating circulating water for heating.

Further, according to the present invention, it is possible to instantaneously heat liquid and instantaneously convert the liquid into vapor by the heating, such that it is possible to easily produce vapor. Further, a wide use is expected, such as, for a cooker, a sterilizer, and an evaporator.

What is claimed is:

1. A fluid heating device comprising:

a planar ceramic heater having a first through-hole formed therein;

upper and lower first planar plates respectively formed on upper and lower faces of the heater, the upper and lower first planar plates having upper and lower first horizontal linear fluid-flow channels formed therein respectively;

upper and lower second planar plates respectively formed on an upper face of the upper first planar plate and an lower face of the lower first planar plate, the upper and lower second planar plates having upper and lower second through-holes formed therein to fluid-communicate with the upper and lower first horizontal linear fluid-flow channels respectively;

an upper cover formed on an upper face of the upper second planar plate, the upper cover having a fluid inlet hole formed therein to communicate with the upper second through-hole; and an lower cover formed on a lower face of the lower second planar plate, the lower cover having a fluid outlet hole formed therein to communicate with the lower second through-hole, wherein an aspect ratio of a cross-sectional area of a heating flow path corresponding to the upper and lower first horizontal linear fluid-flow channels adjacent to the planar ceramic heater is set such that an width (w) of the heating flow path is three times greater than a height (h) of the heating flow path, and wherein area ratio of a heating surface per unit volume and flow speed per unit flow rate of fluid of the heating flow path are increased.

2. A fluid heating device comprising:

a cylindrical hollow case having opposite first and second ends and a side wall, the first end being open and the second end being close, the case having a fluid outlet hole formed at the side wall thereof;

a cylindrical hollow inner structure inserted in the case and spaced from the side wall of the case to extend along a length of the case, the inner structure having opposite both ends being open; and a cylindrical hollow ceramic heater disposed between and spaced from the case and the inner structure so that a first fluid flow and heating channel are formed between the inner structure and the heater, and a second fluid flow and heating channel are formed between the case and the heater, wherein an aspect ratio of a cross-sectional area of a heating flow path corresponding to the upper and lower first horizontal linear fluid-flow channels adjacent to the planar ceramic heater is set such that an width (w) of the heating flow path is three times greater than a height (h) of the heating flow path, and wherein area ratio of a heating surface per unit volume and flow speed per unit flow rate of fluid of the heating flow path are increased.

3. The fluid heating device according to claim 1, wherein the ceramic heater comprises a plurality of ceramic heaters staked alternately one on top of another.

4. The fluid heating device according to claim 1, wherein each of the second plates is made of a ceramic heater.

5. The fluid heating device according to claim 1, wherein the first plates, the second plates and the covers are made of sealable ceramic, plastic, metal or nonmetal.

6. The fluid heating device according to claim 1, wherein the first plates, the second plates and upper and lower covers are integral to each other, the first plates and second plates are integral to each other, the upper first plate and the upper cover are integral to each other, and the lower first plate and the lower cover are integral to each other.

7. The fluid heating device according to claim 2, wherein the case or inner structure is made of sealable ceramic, plastic, metal or nonmetal.

8. The device of claim 1, further comprising upper and lower third planar plates respectively formed between the upper second plate and the upper cover and between the lower second plate and the lower cover, wherein the upper and lower third planar plates have upper and lower second horizontal linear fluid-flow channels formed therein respectively.

* * * * *